United States Patent
Stragier et al.

(10) Patent No.: US 6,733,027 B2
(45) Date of Patent: May 11, 2004

(54) DETACHABLE TRUCK BODY/SEMI TRAILER

(75) Inventors: Marcel G. Stragier, Scottsdale, AZ (US); Louis A. Pellegrini, Sr., Los Altos, CA (US); Louis A. Pellegrini, Jr., Los Altos, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/174,879

(22) Filed: Jun. 19, 2002

(65) Prior Publication Data

US 2003/0234511 A1 Dec. 25, 2003

(51) Int. Cl.$^7$ ............................................... B62D 53/06
(52) U.S. Cl. ...................................... 280/425.1; 410/80
(58) Field of Search ........................... 280/423.1, 425.1, 280/433, 434, 441, 477; 410/80, 77; 414/498

(56) References Cited

U.S. PATENT DOCUMENTS

| | | | |
|---|---|---|---|
| 2,713,500 A | * | 7/1955 | Flynn .......................... 280/407 |
| 3,355,043 A | | 11/1967 | Talbert |
| 3,365,087 A | | 1/1968 | Roedel |
| 3,370,525 A | | 2/1968 | Bowles |
| 3,380,600 A | | 4/1968 | Klanner |
| 3,801,137 A | * | 4/1974 | Zucca ....................... 280/476.1 |
| 3,806,159 A | * | 4/1974 | Self et al. ................. 280/423.1 |
| 3,817,415 A | | 6/1974 | Lewis |
| 4,143,885 A | * | 3/1979 | Mahosky ..................... 280/477 |
| 4,614,355 A | * | 9/1986 | Koch ....................... 280/438.1 |
| 4,728,241 A | | 3/1988 | Talbert |
| 4,871,188 A | * | 10/1989 | Baxter ......................... 280/680 |
| 4,934,896 A | | 6/1990 | DeFilippi |
| 4,986,074 A | | 1/1991 | Hamann |
| 4,986,716 A | | 1/1991 | Winter |
| 5,033,930 A | | 7/1991 | Kraus |
| 5,044,861 A | | 9/1991 | Kirchhoff |
| 5,064,332 A | | 11/1991 | Edelhoff |
| 5,082,416 A | | 1/1992 | Bock |
| 5,203,669 A | | 4/1993 | Klossek |
| 5,562,390 A | | 10/1996 | Christenson |
| 5,626,356 A | * | 5/1997 | Harwood .................. 280/405.1 |
| 5,725,350 A | | 3/1998 | Christenson |

* cited by examiner

*Primary Examiner*—S. Joseph Morano
*Assistant Examiner*—Tony Winner
(74) *Attorney, Agent, or Firm*—Parsons & Goltry; Robert A. Parsons; Michael W. Goltry

(57) ABSTRACT

A vehicle for collecting and hauling material includes a truck chassis and a detachable truck body/semi trailer. The detachable truck body/semi trailer includes a body having a rear end, a front end, and a bottom surface, a frame coupled to the bottom surface, the frame extending from proximate the rear end to a position spaced a distance from the front end, and an axle mounted to the frame. A coupling assembly couples the truck body/semi trailer to the truck chassis and is movable between a truck body configuration in which the frame abuts the truck frame and articulation of the detachable truck body/semi trailer is prevented and a semi trailer configuration wherein the frame is spaced apart from the truck frame and articulation of the detachable truck body/semi trailer is permitted.

23 Claims, 5 Drawing Sheets

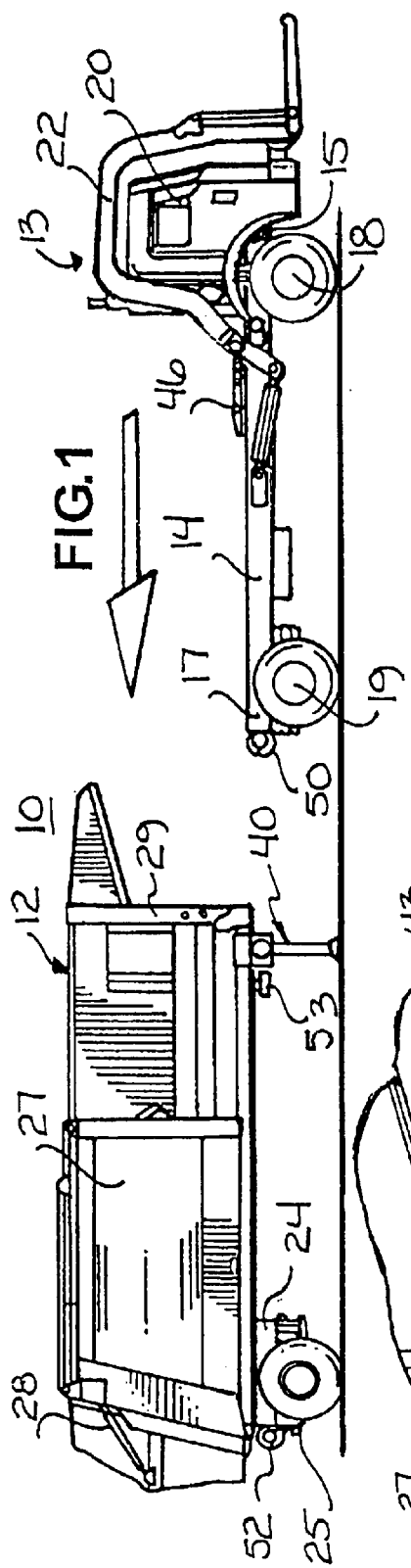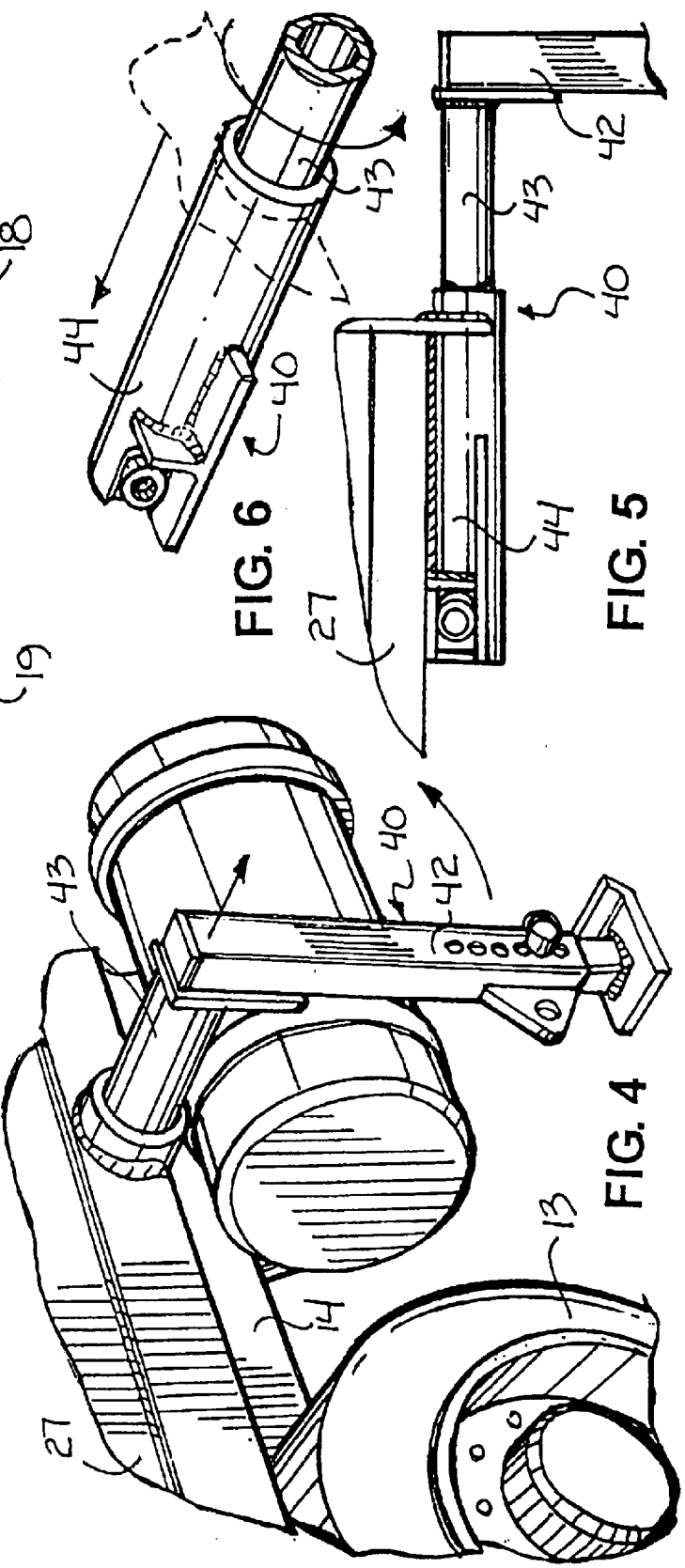

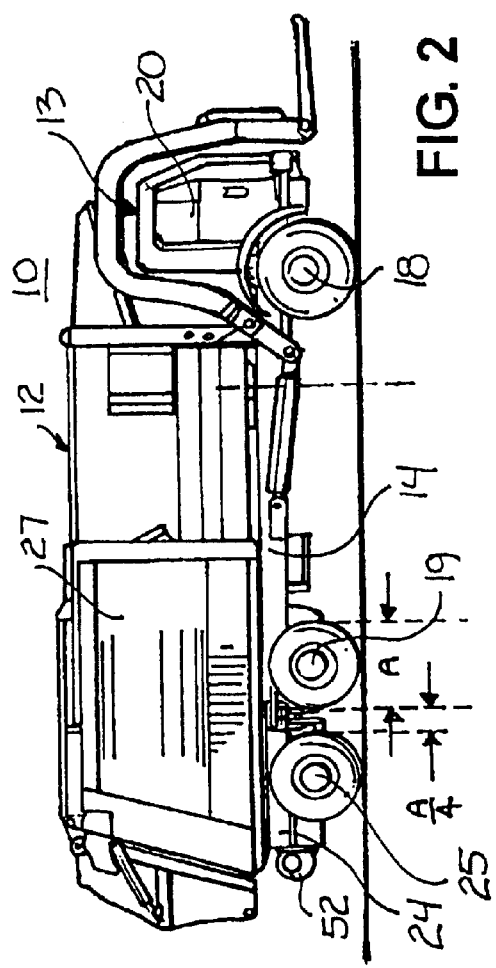
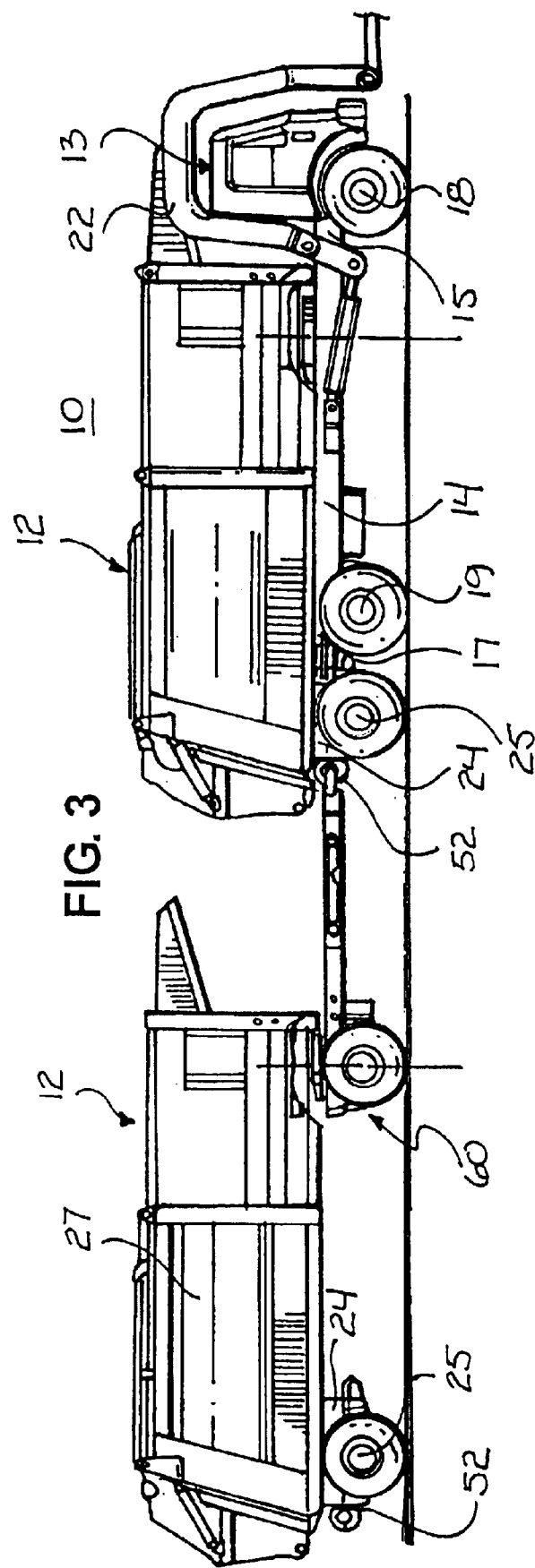

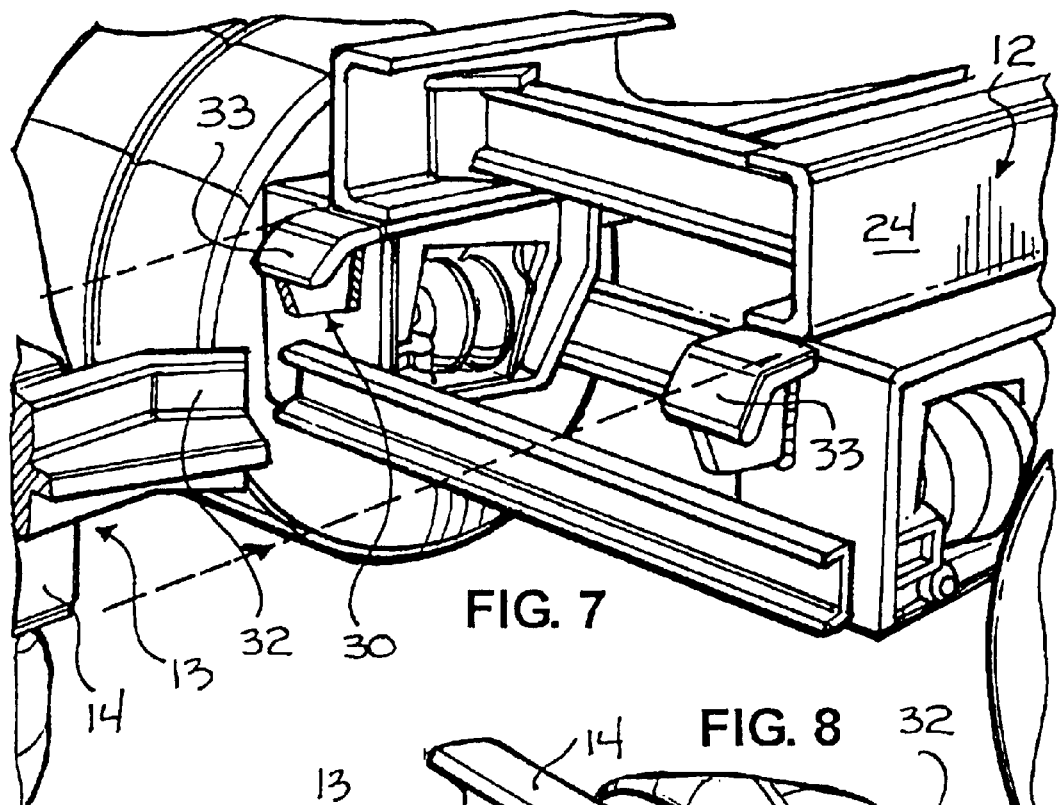
FIG. 7
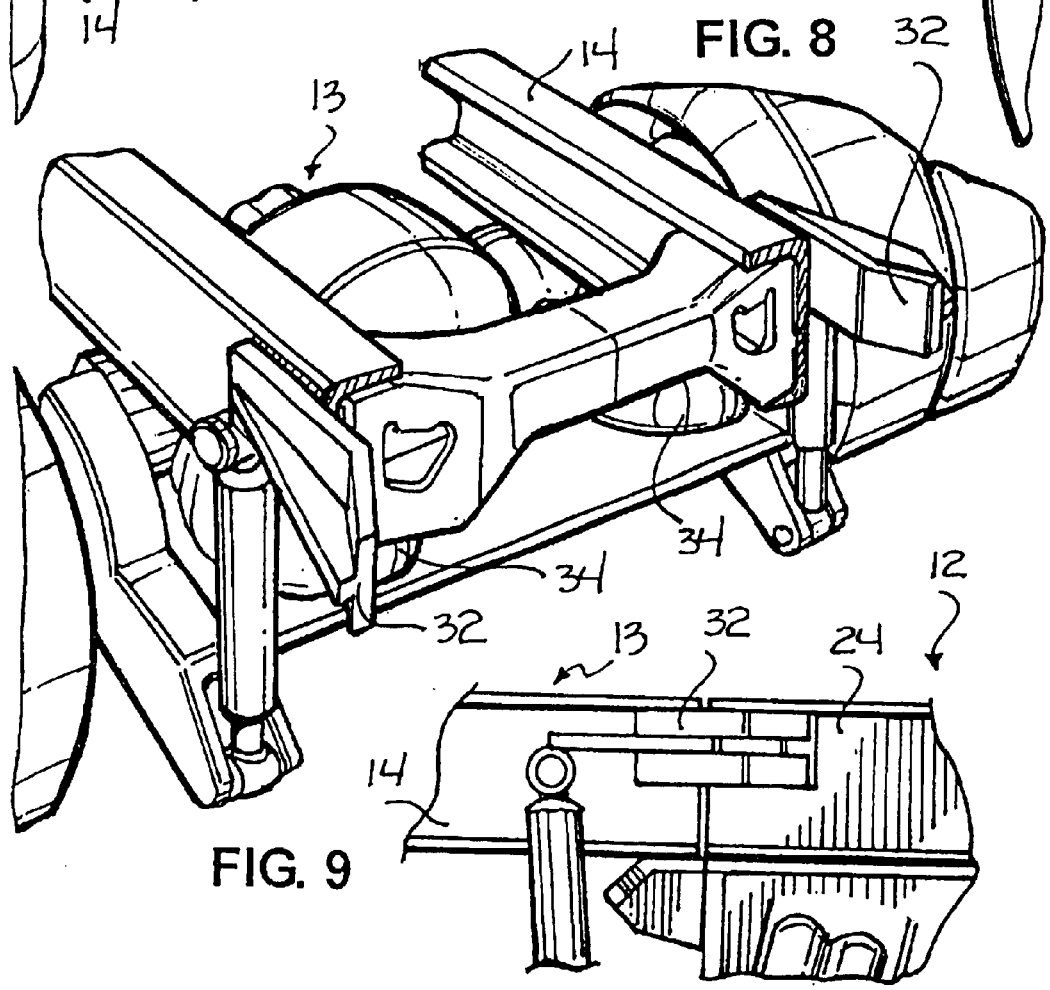
FIG. 8
FIG. 9

DETACHABLE TRUCK BODY/SEMI TRAILER

FIELD OF THE INVENTION

This invention relates to vehicles for collecting and hauling materials.

More particularly, the present invention relates to semi-trailer systems for vehicles.

BACKGROUND OF THE INVENTION

Vehicles for hauling materials generally come in one of two types. One type is a truck having a body. The other is a tractor arrangement for pulling a semi trailer. Each has its benefits and detriments. Trucks with dedicated bodies are necessarily limited to their specific function, reducing flexibility. Additionally, trucks having bodies have load limits depending on their length, and are often limited in their use areas due to maneuvering characteristics. Semi trailers have increased maneuverability and can carry heavier loads due to increased axle spacing, but often have difficulty being adapted to use with various auxiliary equipment such as front loader arms on refuse collection vehicles. However, semi trailers are very versatile and can be interchanged as necessary.

It would be highly advantageous, therefore, to remedy the foregoing and other deficiencies inherent in the prior art.

Accordingly, it is an object of the present invention to provide a new and improved vehicle including a truck body/semi trailer.

Another object of the invention is to provide a truck body/semi trailer which can be attached to a truck chassis as either a truck body or a semi trailer.

Yet another object of the invention is to provide a system to make the interchange of truck bodies simple and expeditious.

SUMMARY OF THE INVENTION

Briefly, to achieve the desired objects of the instant invention in accordance with a preferred embodiment thereof, provided is a vehicle for collecting and hauling material. The vehicle includes a truck chassis and a detachable truck body/semi trailer attachable in a truck body configuration and a semi trailer configuration. The truck chassis includes a truck frame having a front end and a rear end, a front axle mounted proximate the front end, a rear axle mounted proximate the rear end, a cab mounted on the front end of the chassis, and a coupling member carried by the truck frame intermediate the cab and the rear end. The detachable truck body/semi trailer includes a body having a rear end, a front end, and a bottom surface, a frame coupled to the bottom surface, the frame extending from proximate the rear end to a position spaced a distance from the front end, and an axle mounted to the frame. A coupling assembly couples the truck body/semi trailer to the truck chassis and is movable between the truck body configuration in which the frame abuts the truck frame and articulation of the detachable truck body/semi trailer is prevented and the semi trailer configuration wherein the frame is spaced apart from the truck frame, and articulation of the detachable truck body/semi trailer is permitted.

In a more specific aspect, the distance of the position of the frame spaced from the front end is sufficient to accommodate the truck frame from the rear end to the cab, with the front end of the frame substantially abutting the rear end of the truck frame when in the truck body configuration.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a side plan view of a system according to the present invention illustrating a truck body/semi trailer and truck in a separated configuration;

FIG. 2 is a side plan view of a system according to the present invention with the truck body/semi trailer coupled to the truck in a truck body configuration;

FIG. 3 is a side plan view of an embodiment of the system including a second truck body/semi trailer;

FIG. 4 is a partial perspective view illustrating a stand for the truck body/semi trailer;

FIG. 5 is a side plan view of the stand of FIG. 4;

FIG. 6 is a partial perspective view illustrating the stand of FIGS. 4 and 5

FIG. 7 is a partial perspective view illustrating an alignment system according to the present invention;

FIG. 8 is a partial perspective view of the axle of the truck frame, illustrating a portion of the alignment system of FIG. 7;

FIG. 9 is a partial sectional side view of the alignment system of FIG. 7;

DETAILED DESCRIPTION OF THE PREFERRED EMBODIMENT

Figure 10:
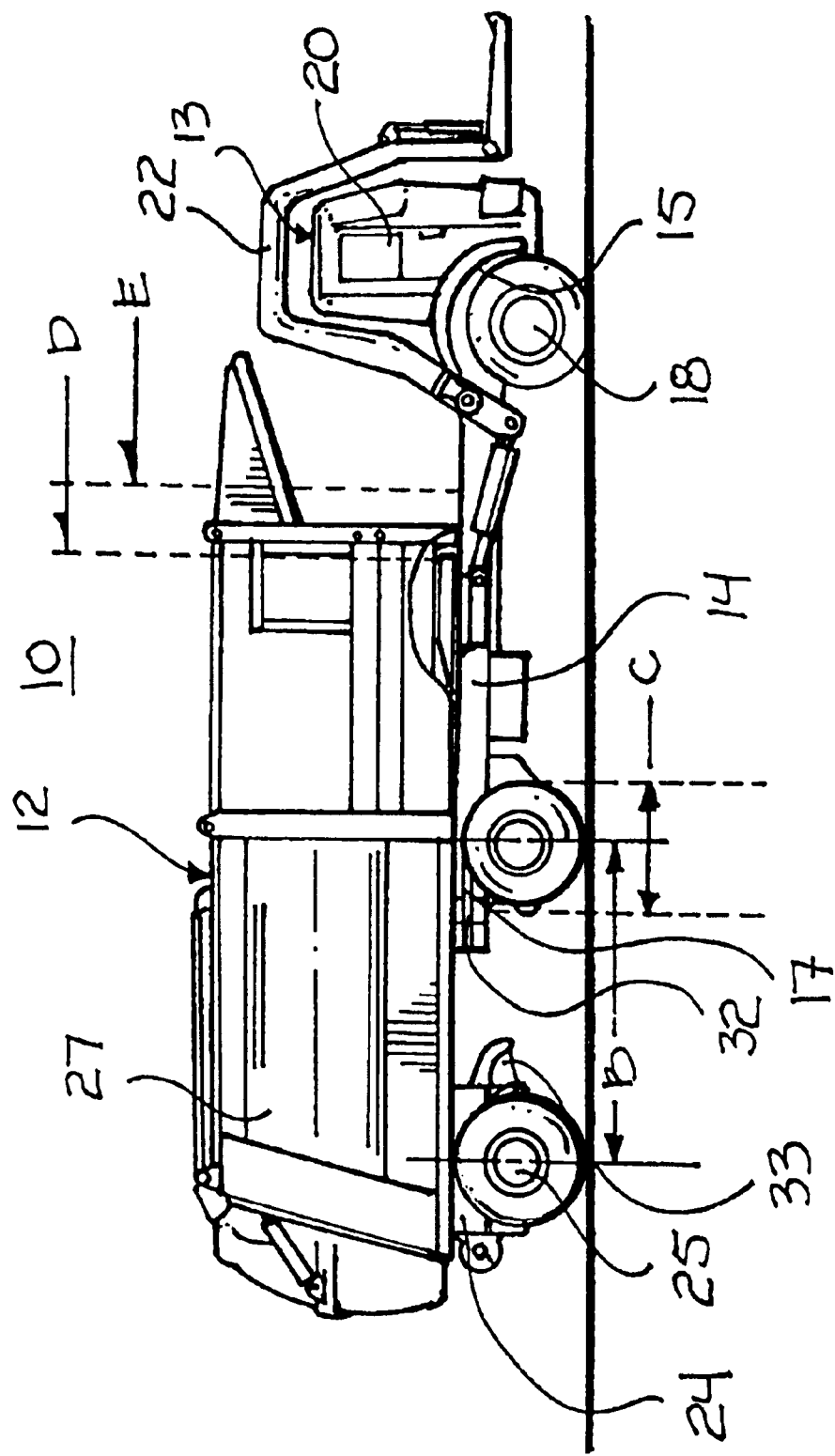
FIG. 10 is a side plan of the system with the truck body/semi trailer coupled to the truck in a semi trailer configuration.

Turning now to the drawings in which like reference characters indicate corresponding elements throughout the several views, attention is first directed to FIGS. 1 and 2 which illustrate a system for collecting and hauling materials, generally designated 10. System 10 includes a detachable truck body/semi trailer 12 which can be attached to a truck 13 having a frame 14 so as to serve as a body for the truck during part of the operation (FIG. 2) and then may either be relocated rearward on frame 14 of truck 13 or detached to be used in a manner similar to that of a trailer or semi trailer (FIG. 10). Truck 13 is a standard truck chassis such as is normally used for the intended purpose, i.e. refuse collection, and includes frame 14 having a front end 15 and a rear end 17. A front axle 18 is mounted proximate front end 15, a rear axle 19 is mounted proximate rear end 17, and a cab 20 is mounted proximate front end 15.

Truck 13 and semi trailer 12 can have various specialized equipment, common to the function. In this embodiment refuse collection is the function and a front loader 22 is carried by truck 13. It will be understood that a loading mechanism can instead be carried by semi trailer 12. Other loading mechanisms such as side loader arms or rear loading tailgates may also be employed. System 10 may be modified with accessories to suit the designated use in a number of ways.

Referring specifically to FIG. 1, semi trailer 12 includes a frame 24 carried by an axle 25 and carrying a body 27.

Body 27 has a rear end 28 and a front end 29. Frame 24 ends in a position slightly forward of axle 25. In other words frame 24 extends from proximate rear end 28 to a position spaced a distance from front end 29. The distance can vary depending on the vehicles, but is preferably more than half the length of body 27. Another way to view the distance of the spacing is that it has a length sufficient to receive truck frame 14 from rear end 17 to cab 20 or that rear axle 19 of truck 13 is positioned adjacent axle 25 in a relationship substantially similar to the axles in a tandem axle truck. The spacing distance along with a coupling assembly which will be described presently, permits coupling of the truck body/semi trailer 12 to truck chassis 13 in two distinct configurations, a truck body configuration and a semi trailer configuration. In the truck body configuration, frame 24 abuts truck frame 14 and articulation of detachable truck body/semi trailer 12 is prevented, and in the semi trailer configuration frame 24 is spaced apart from truck frame 14 and articulation of detachable truck body/semi trailer 12 is permitted.

Turning now to FIGS. 7–9, an alignment system 30 is illustrated. Alignment system 30 is considered a portion of the coupling assembly and includes a pair of horizontal aligning brackets 32 carried on opposing sides of a rear portion of truck frame 14 and vertical brackets 33 carried by a lower front portion of frame 24 and axle assembly 25 of truck body/semi trailer 12. Horizontal aligning brackets 32 flare outwardly from frame 14, and are intended to receive and engage frame 24 for alignment and abutting engagement. Vertical brackets 33 slope downward away from frame 24 and act as a ramp for receiving frame 14. Alignment system 30 guides frame 14 of truck 13 and frame 24 of truck body/semi trailer 12 into alignment for the truck body configuration, maintains alignment and prevents articulation of trailer 12 in the truck body configuration. Referring specifically to FIG. 8, truck 13 may be furnished with an airbag suspension 34, which allows the height of frame 14 to be adjusted with respect to frame 24 of truck body/semi trailer 12. Note that a standard spring suspension may suffice and the frame height adjustment accomplished by the truck body/semi trailer.

With reference to FIGS. 4–6, truck body/semi trailer 12 is provided with a stand assembly 40 which supports the front when truck 13 is not present and includes two stand members 42 coupled to opposing sides of body 27 of truck body/semi trailer 12. Stand members 42 are moveable between a lowered configuration and a raised configuration. In the lowered configuration stand members 42 support truck body/semi trailer 12 while it is detached. Stand members 42 are moved to the raised configuration so they are out of the way while truck body/semi trailer 12 is moved. Stand members 42 can be spread outwardly from body 27 a distance sufficient to permit passage of the truck or dolly wheels between them while they are lowered. Stand members 42 are attached to rods 43 received within a receptacle 44 attached to body 27. Rod 43 is slidably and rotatably received within receptacle 44, permitting lateral movement and rotation of leg members 42.

Figure 11:
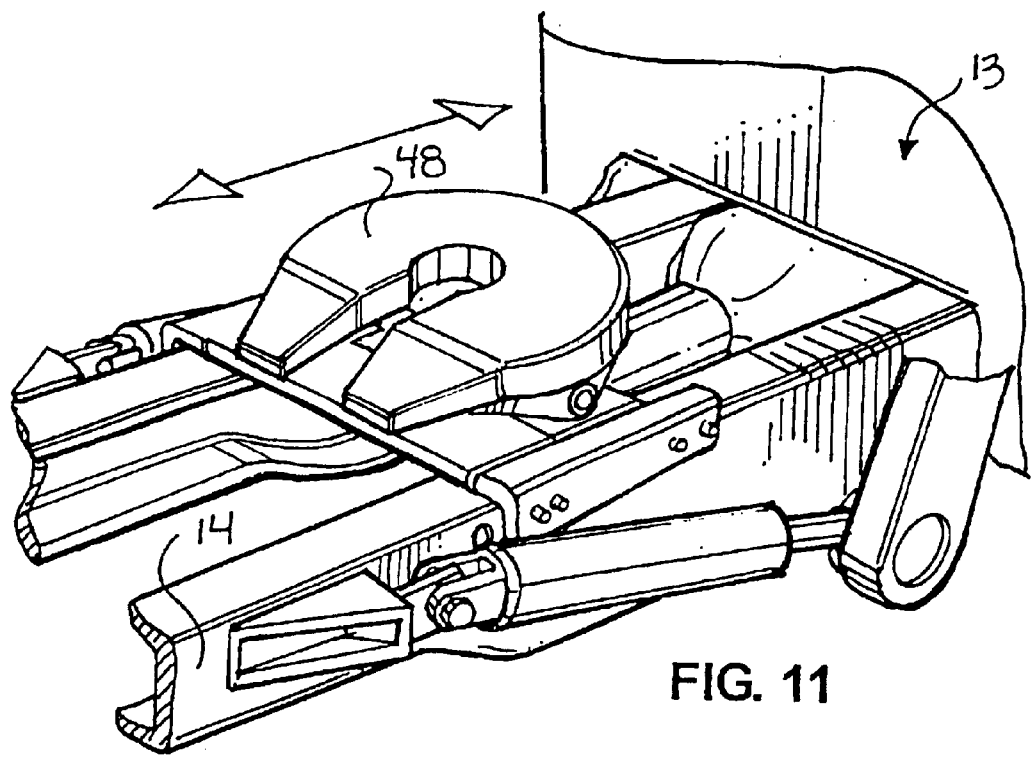
FIG. 11 is a partial perspective view illustrating a moveable coupling mechanism on the truck.

Still referring to FIGS. 1 and 2, with additional reference to FIG. 11, truck 13 is also equipped with a connecting device like a $5^{th}$ wheel plate 46, as another portion of the coupling assembly, to hold the front of truck body/semi trailer 12 in place and capable of carrying the towed load when the truck is towing a second truck body/semi trailer behind the first as is shown in FIG. 3. Truck 13 may also have either a sliding connector 48 (FIG. 11 shows a slidable fifth wheel) or a second connector (not shown) located on frame 14. In a typical system, the second connector would be located about six feet behind the first for reasons that will be explained below. Sliding connector 48 is preferably also adjustable approximately six feet rearward. Connections such as for electrical, air and hydraulics between truck 13 and truck body/semi trailer 12 must be detachable and re-attachable. Truck 13 may also be furnished with a pintle hook 50 at the rear of frame 14, which can be used to maneuver a converter dolly 60 (FIGS. 12 and 13) described below.

Truck body/semi trailer 12 can be furnished with a pintle hook 52 or other connector at the rear of frame 24 for towing converter dolly 60, connection devices to mate with the electrical, air and hydraulics in the system, a king pin 53 or other mating device for the connection with truck 13 or dolly 60 and an airbag suspension capable of acting in the manner of a leveled or height controlled fixed trailer axle or truck drop axle. The suspension may be retracted or its pressure on the ground may be adjusted by a pressure regulator regulating the pressure to the airbag suspension while mounted to truck 13. Axle 25 may also act as a trailer suspension by using a leveling valve to automatically adjust the height of frame 24 above the ground. Axle 25 might further be furnished with a control device to enable the operator to raise or lower frame 24 through a short range compatible with the range of motion of the air bags. Truck body/semi trailer 12 might also be furnished with other auxiliary devices or equipment needed to operate in the system.

Figure 12:
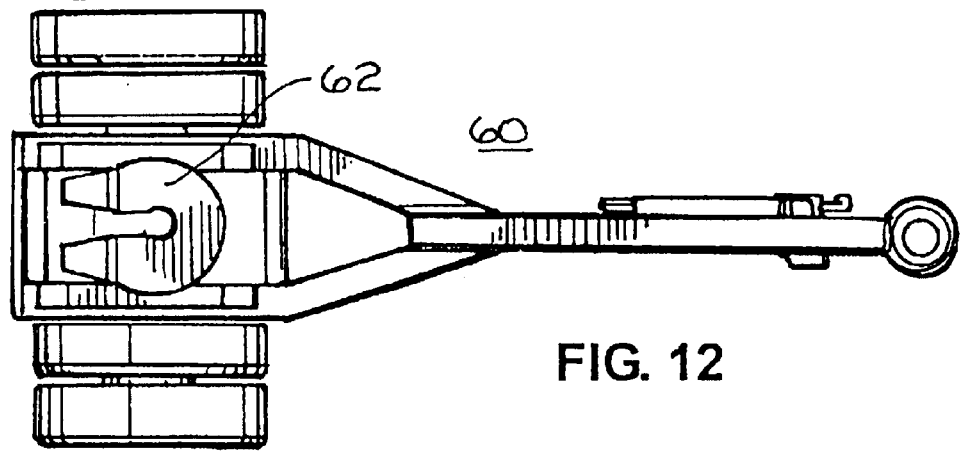
FIG. 12 is a top plan view illustrating the dolly of FIG. 3.
Figure 13:
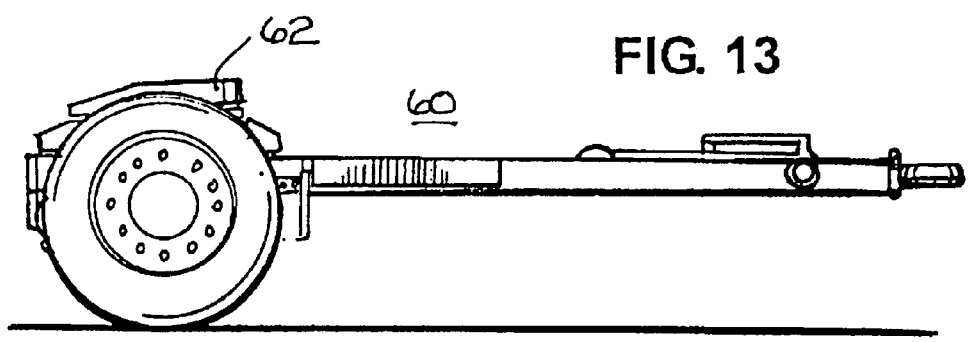
FIG. 13 is a side plan view illustrating the dolly of FIGS. 3 and 12.

Referring now to FIGS. 12 and 13, another piece of equipment useful in system 10, converter dolly 60, is illustrated. Converter dolly 60 is a vehicle containing a $5^{th}$ wheel plate 62 or other connecting device, preferably similar to the one on truck 13. Dolly 60 may also have an air suspension with manual auxiliary controls in addition to its normal leveling valve. The manual controls would allow the operator to raise or lower $5^{th}$ wheel plate 62 or other connecting device to match the height of truck body/semi trailer 12. Dolly 60 would be equipped to connect to the air, electric, hydraulic or other services.

In operation, an operator who understands the functions of the variously equipped vehicles described above will use the system in the following manner. In a typical operation the operator might start the day with his trailers empty and set up as shown in FIG. 2 with one semi trailer mounted on the truck chassis and connected to the tongue of the converter dolly at the rear. The second trailer would be mounted to the dolly. The operator would drive to a location near his collection route; if he were using the trailers to collect refuse. He would detach the dolly, leaving the second trailer and the dolly parked. His chassis, if he were collecting refuse for example, would be equipped with loading equipment to load the trailer. For example, the chassis might have front loader arms attached to the frame between the front of the trailer and the cab. These arms would engage large containers as is common in the trade, lift the containers over the cab and dump their contents into a hopper at the front of the trailer. Similarly, the chassis might be equipped with a side-loading arm that would engage usually smaller containers beside the truck as is common in the trade, and dump their contents into the trailer. Further, the trailer might be equipped with a rear-loading tailgate, which could be loaded manually, or mechanically according to the practice common in the trade. The trailer might well be loaded in other ways.

During loading operations, the trailer would be attached to the truck by the connecting device and the two frames held in alignment by the aligning device shown in FIGS.

7–9. The trailer axle could function like a drop axle, being retracted and held off the road while the trailer was empty and then lowered and pressed down on the road by the regulated pressure commonly used to set the load in a drop axle when the operator finds it proper. Once the first trailer was loaded, the operator would find a convenient place to drop it. He would lower the stands shown in FIGS. 4–6. He would disconnect the air, electric, hydraulic or other connections. He would then convert to the trailer axle from the drop axle by operating the appropriate control. Note that the conversion might occur automatically when the electric service from the truck was disconnected. In any event, the trailer axle leveling valve might be set to locate the trailer frame higher than the truck frame, for example ½ inch higher, so that the truck could easily be pulled free of the aligning and connecting devices and driven forward between the stands to leave the trailer parked.

Next, the operator would lower the stands on the second trailer, operate the control on the dolly to lower the trailer onto the stand, disconnect any air, electric hydraulic or other connections, pull the dolly out from under the second trailer, move it to the first trailer and engage it with the connecting device. He would then raise it and stow the stands, connecting the air, electric, hydraulic or other connections.

Now the operator could back his truck under the second trailer, engaging the aligning and connecting devices to secure the trailer to the truck. He might adjust the height of the truck frame using the truck air suspension, if that were needed, and stow the stands. He would convert the trailer axle to a drop axle and either retract it or not. He would connect the air, electric, hydraulic or other connections. He could then proceed to load the second trailer body.

When he was finished with the second trailer body, he could then return to the first, connect to the dolly, hook up any air, electrical or hydraulic connections and drive away hauling the first trailer body mounted on the dolly behind the second body mounted on the truck. The operator would then haul his load to a designated location and discharge it in the conventional way common in the trade.

The method of using the system described above should be regarded as typical, but not the only method, by any means. For example, the semi trailer bodies might all be kept in a central yard; taken from there by the truck to be filled and delivered back to the yard full. A standard tractor without self-loading equipment could haul them. Alternatively, the semi trailers might be set up along the collection route by such a tractor and merely filled and dropped off by the truck. Such methods of using the system described might increase payloads by hauling with trucks not equipped with heavy loading devices.

Furthermore, the system might be useful in applications where a single chassis might be used to engage a multiplicity of bodies, whether trailers or not. Such a system would be useful to replace typical detachable body systems, which depend on heavy and awkward hardware to exchange bodies. A typical application, for example, might use the same truck to haul a body equipped for winter functions like hauling snow or spreading sand and then disengage it to use the same truck to haul a body equipped for summer functions like spreading asphalt or collecting leaves.

The system is also adaptable to another function. By equipping the truck with a connecting device (such as a $5^{th}$ wheel) that can be slid along the truck frame, the trailer body's legal hauling capacity may be increased. The load that an axle may legally apply to the road is governed by rules intended to ensure the safety of structural roadway appurtenances such as bridges. Thus, for example, if two axles are 8 feet or less apart, they may be loaded to 34,000 lbs. But if they are 10 feet or more apart, they may be loaded to 40,000 lbs, an increase of about 17-½%.

FIG. 10 shows a configuration that implements this rule to increase the potential payload of the trailers. Thus, for example, the truck might haul the trailer unloaded in the normal forward connector position shown in FIG. 3 where it looks and behaves like a conventional tandem axle truck. When the trailer body is loaded, the connector (the $5^{th}$ wheel for example) might be slid back, or the body moved back to engage another connector. As shown in FIG. 10, then the body would become a semi trailer pivoting on the connector and the truck would become a tractor. Such a configuration might have advantages, which the system would provide.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. A detachable truck body/semi trailer comprising:
   a body having a rear end, a front end, and a bottom surface;
   a coupling assembly including a coupling mechanism carried by the bottom surface proximate the front end for allowing alternate coupling of the detachable truck body/semi trailer to a vehicle as a truck body and as a semi-trailer;
   a frame coupled to the bottom surface, the frame extending from proximate the rear end to a position spaced a distance from the front end;
   an alignment mechanism carried by the frame for aligning the frame with a frame of a truck chassis receivable thereagainst; and
   an axle mounted to the frame.

2. A detachable truck body/semi trailer as claimed in claim 1 wherein the coupling mechanism is a king pin for use with a fifth wheel.

3. A detachable truck body/semi trailer as claimed in claim 1 wherein the distance of the position spaced from the front end is greater than halt a length of the body.

4. A detachable truck body/semi trailer as claimed in claim 1 wherein the alignment mechanism includes brackets coupled to the frame for guiding the frame of a truck chassis to align with the frame.

5. A detachable truck body/semi trailer removably coupled to a truck chassis including a truck frame having a front end and a rear end, a front axle mounted proximate the front end, a rear axle mounted proximate the rear end, a cab mounted on the front end of the chassis, and a coupling member carried by the truck frame intermediate the cab and the rear end, the detachable truck body/semi trailer comprising:
   a body having a rear end, a front end, and a bottom surface;
   a complemental coupling member carried by the bottom surface proximate the front end and received by the coupling member of the truck chassis; and
   a frame coupled to the bottom surface, the frame extending from proximate the rear end to a position spaced a distance from the front end, the distance of the position spaced from the front end is sufficient to accommodate the truck frame from the rear end to the cab, with the front end of the frame substantially abutting the rear end of the truck frame, and an axle mounted to the frame.

6. A detachable truck body/semi trailer as claimed in claim 5 wherein the complemental coupling member is a king pin and the coupling member is a fifth wheel.

7. A detachable truck body/semi trailer as claimed in claim 5 wherein the distance of the position spaced from the front end is greater than half a length of the body.

8. A detachable truck body/semi trailer as claimed in claim 5 wherein the truck body/semi trailer is movable between a truck body configuration in which the frame abuts the truck frame and articulation of the detachable truck body/semi trailer is prevented and a semi trailer configuration wherein the frame is spaced apart from the truck frame and articulation of the detachable truck body/semi trailer is permitted.

9. A detachable truck body/semi trailer as claimed in claim 8 further including a first alignment mechanism carried by one of the frame and the truck frame, and a second alignment mechanism carried by one of the frame and the truck frame for aligning the frame with the truck frame and preventing articulation of the trailer in the truck body configuration.

10. A detachable truck body/semi trailer as claimed in claim 9 wherein the first alignment mechanism includes brackets coupled to the frame for guiding and vertically aligning the truck frame with the frame, and the second alignment mechanism includes brackets coupled to the truck frame for guiding and horizontally aligning the truck frame with the frame.

11. A system for collecting and hauling material comprising:
a truck chassis including a truck frame having a front end and a rear end, a front axis mounted proximate the front end, a rear axle mounted proximate the rear end, and a cab mounted on the front end of the chassis;
a detachable truck body/semi trailer including a body having a rear end, a front end, and a bottom surface, a frame coupled to the bottom surface, the frame extending from proximate the rear end to a position spaced a distance from the front end, and an axle mounted to the frame; and
a coupling assembly coupling the truck body/semi trailer to the truck chassis and movable between a truck body configuration in which the frame abuts the truck frame and articulation of the detachable truck body/semi trailer is prevented and a semi trailer configuration wherein the frame is spaced apart from the truck frame, and articulation of the detachable truck body/semi trailer is permitted.

12. A system as claimed in claim 11 wherein the coupling assembly includes a king pin carried by the body proximate the front end and a fifth wheel carried by the truck frame intermediate the cab and the rear end.

13. A system as claimed in claim 12 wherein the coupling assembly includes the fifth wheel movable between a rearward position and a forward position.

14. A system as claimed in claim 12 wherein the coupling assembly includes another fifth wheel carried by the truck frame proximate the rear end.

15. A system as claimed in claim 11 wherein the distance of the position spaced from the front end is greater than half a length of the body.

16. A system as claimed in claim 11 wherein the distance of the position spaced from the front end, positions the rear axle of the truck chassis adjacent the axle of the detachable truck body/semi trailer in a relationship substantially similar to axles in a tandem axle truck, in the truck body configuration.

17. A system as claimed in claim 11 wherein the distance of the position spaced from the front end is sufficient to accommodate the truck frame from the rear end to the cab, with the front end of the frame substantially abutting the rear end of the truck frame.

18. A system as claimed in claim 17 wherein the coupling assembly further includes a first alignment mechanism carried by one of the frame and the truck frame, for aligning the frame with the truck frame and preventing articulation of the frame in the truck body configuration.

19. A system as claimed in claim 18 wherein the coupling assembly further includes a second alignment mechanism carried by the other one of the frame and the truck frame, for aligning the frame with the truck frame and preventing articulation of the frame in the truck body configuration.

20. A system as claimed in claim 19 wherein the first alignment mechanism includes brackets coupled to the frame for guiding and vertically aligning the truck frame with the frame, and the second alignment mechanism includes brackets coupled to the truck frame for guiding and horizontally aligning the truck frame with the frame.

21. A method of transporting material comprising the steps of:
providing a truck chassis;
providing a detachable truck body/semi trailer including a body having a rear end, a front end, and a bottom surface, a frame coupled to the bottom surface, the frame extending from proximate the rear end to a position spaced a distance from the front end, and an axle mounted to the frame;
coupling the truck body/semi trailer to the truck chassis in one of a truck body configuration in which the frame abuts the truck frame and articulation of the detachable truck body/semi trailer is prevented and a semi trailer configuration wherein the frame is spaced apart from the truck frame and articulation of the detachable truck body/semi trailer is permitted, for collection of materials; and
coupling the truck body/semi trailer to the truck chassis in one of the truck body configuration and the semi trailer configuration for transporting the material.

22. A method as claimed in claim 21 wherein the step of coupling the truck body/semi trailer for transporting the material includes:
providing a dolly;
coupling a second truck body/semi trailer to the truck chassis in one of the truck body configuration and the semi trailer configuration;
coupling the truck body/semi trailer to the dolly in the semi trailer configuration; and
coupling the dolly to the second truck body/semi trailer.

23. A method as claimed in claim 21 wherein the distance of the position spaced from the front end, positions the rear axle of the truck chassis adjacent the axle of the detachable truck body/semi trailer in a relationship substantially similar to axles in a tandem axle truck, in the truck body configuration.

* * * * *